United States Patent

Schweizer et al.

(10) Patent No.: US 9,505,096 B2
(45) Date of Patent: Nov. 29, 2016

(54) MACHINING TOOLS, WASTE REMOVAL DEVICES, AND RELATED METHODS

(75) Inventors: Werner Schweizer, Jenins (CH); Gerhard Steinhart, Flums (CH); Erwin Keller, Gruesch (CH)

(73) Assignee: TRUMPF Maschinen Gruesch AG, Ausserfld (CH)

( * ) Notice: Subject to any disclaimer, the term of this patent is extended or adjusted under 35 U.S.C. 154(b) by 1220 days.

(21) Appl. No.: 13/482,189

(22) Filed: May 29, 2012

(65) Prior Publication Data

US 2013/0149948 A1 Jun. 13, 2013

(30) Foreign Application Priority Data

May 31, 2011 (DE) .................. 10 2011 050 749

(51) Int. Cl.
*B23K 11/00* (2006.01)
*B23Q 11/00* (2006.01)

(52) U.S. Cl.
CPC ......... *B23Q 11/0046* (2013.01); *B23K 26/142* (2015.10); *Y02P 70/171* (2015.11)

(58) Field of Classification Search
CPC ............ B23Q 11/0046; B23K 26/142; Y02P 70/171
IPC ...................................... B23Q 11/00
See application file for complete search history.

(56) References Cited

U.S. PATENT DOCUMENTS 4,058,299 A 11/1977 Lindkvist
8,574,487 B2 * 11/2013 Zeygerman ........... B08B 15/007
266/48

FOREIGN PATENT DOCUMENTS

| CH | 616101 A5 | 3/1980 |
| DE | 3531192 A1 | 3/1987 |
| DE | 8813739 U1 | 2/1989 |
| DE | 4130162 A1 | 3/1993 |

* cited by examiner

*Primary Examiner* — David Redding
(74) *Attorney, Agent, or Firm* — Fish & Richardson P.C.

(57) ABSTRACT

The invention relates to waste material removal devices and related assemblies and methods. In certain aspects of the invention, a machining tool has a waste material removal device, which comprises a suction slide for carrying out a movement in a translational direction (x). The suction slide includes a suction arm support and a suction arm, and the suction arm is fastened pivotably on the suction arm support. In certain aspects of the invention, a waste material removal device has a suction arm having a suction opening and a separating device for separating solid waste material parts according to their weight arranged at the suction opening. The suction opening is oriented at an angle between 10° and 170° to a longitudinal axis of the suction arm.

19 Claims, 6 Drawing Sheets

MACHINING TOOLS, WASTE REMOVAL DEVICES, AND RELATED METHODS

CROSS REFERENCE TO RELATED APPLICATION

This application claims priority under 35 USC §119(a) from German patent application DE 10 2011 050 749.3, filed May 31, 2011, which is incorporated herein by reference.

TECHNICAL FIELD

The invention relates to waste material removal devices for machining tools and related methods.

BACKGROUND

A device having one or more cutting units is known from CH 616 101 A5. The device is assigned to a cutting table. This cutting unit includes a cutting burner and a suction device. An upwardly open suction box, which is movable along a cutting table, is positioned beneath the table. The suction box extends transversely across the width of the cutting table and is attached to the suction device.

A laser machining device having a machining table for receiving a workpiece is known from DE 41 30 162 C2. A catching and suction wall is formed below the machining table and extends completely below the supporting element of the machining table. The gaseous and smoke-like waste materials produced are extracted in lateral openings and the waste material parts are caught in the catching tub.

A laser cutting device is also known from DE 88 13 739 U1. In that laser cutting device, suction boxes are provided above and below the workpiece support to extract the process gases. These suction boxes are synchronized in terms of their working motion by a control line to the cutting head.

DE 35 31 192 A1 describes a flame-cutting table having a suction device for extracting gases which are produced during the flame-cutting process. A movable suction hopper is arranged below a support grate. The hopper extends over the entire width of the support grate and the suction connections thereof open into a movable suction carriage. The flame-cutting table requires a fan of high suction performance.

SUMMARY

In some aspects of the invention, a machining tool having a waste material removal device provides a suction effect sufficient to extract waste materials using a less powerful fan.

In one aspect of the invention, a machining tool has a waste material removal device. The waste material removal device includes a suction slide that includes a suction arm support and a suction arm fastened pivotably on the suction arm support. At least the suction arm of the suction slide can therefore be positioned and operated below the workpiece to be machined in a region below the machining point or directly below the machining point. As a result a relatively small suction cross-section compared to that required in previous waste material removal devices is sufficient to achieve a suction effect. The same or an improved suction effect compared to that of conventional waste material removal devices can therefore be achieved using a less powerful fan.

The suction arm may include a device for separating solid waste material parts according to their weight. Only gases, smoke, cinders and small workpiece parts are thus extracted and removed via the suction slide. Larger workpiece parts are not sucked in but remain on the separating device, which can be formed as a deflector, or in particular fall onto a sweep-off plate in the machining tool or onto the base below the machine due to a rapid working motion (e.g., a pivoting motion). Cut workpiece parts of all sizes are thus prevented from falling into suction boxes or suction tubs, as would otherwise be routine in conventional suction devices, and these boxes and tubs therefore do not have to be emptied often and at high frequency, which would require considerable effort. Furthermore, individual components are prevented from remaining on the deflector, on which a cutting beam (e.g., a laser beam), may impinge, whereby unintended welds or damage to the workpiece parts lying thereon could occur. This separating device (e.g., the deflector), may also serve as a heat protection shield for parts lying on the base or sweep-off plate so that a cutting beam emerging from the workpiece on the underside cannot act on the components arranged on the sweep-off plate. These workpiece parts therefore can be easily removed from the machining tool.

This deflector can be formed in a planar manner as a flat sheet part and, in particular, can be fastened exchangeably on the suction arm. In particular, simple replacement of the deflector can thus be provided. The suction arm and/or the suction arm support can include a duct for the removal of waste gas.

The waste material removal device of the machining tool may have a belt with an opening, which is designed to drive the suction slide in the translational direction and to connect, by means of the opening in the belt, the duct in the suction slide to a fixed suction duct for removal of the waste gas. The suction duct can extend in the X-direction over the entire width of the workpiece support or of a machining area of the machining tool and can be formed as a fixed duct along the longest axis of movement (e.g., the X-axis of the machining tool).

The suction slide can be arranged in a self-supporting manner so as to be movable in relation to the suction duct. This makes it possible to pass over an underlying collection chamber for workpiece parts on the base or on the sweep-off plate of the machining tool.

A portion of the duct in the suction arm and/or the suction arm support can be arranged concentrically with a pivot axis of the suction arm. Each of the three aforementioned measures (duct for the removal of waste gas, driving belt with an opening, and arrangement of a portion of the duct concentrically with the pivot axis) makes its own contribution to a reliable, compact and well-arranged design with minimal parts and minimal moved mass.

The suction slide (e.g., the suction arm of the suction slide), can include a device for separating solid and gaseous waste materials. For example, this separating device can be formed as a baffle plate, which can be provided in the suction arm or in the transition region between the suction arm and the suction arm support. A tubular portion can be provided in the transition region to receive the suction arm pivotably in relation to the suction arm support.

The suction slide can include a collection container for temporary storage of solid waste materials. Each of the two aforementioned measures (device for separating solid and gaseous waste materials and collection container for temporary storage of solid waste materials) contribute to preventing small suctioned parts from collecting at points which are not easily accessible or at points at which the collection of small parts is undesirable for other reasons. In addition, small parts therefore are not extracted by the suction slide and do not reach the fixed suction duct. In particular, the collection container for temporary storage is provided in a transition region between the suction arm and the suction arm support.

The waste material removal device of the machining tool may have a device which is designed to remove solid waste material parts from the suction arm or suction arm support. For example, this can be achieved by a controllable sweep-off flap. The suction slide can thus be cleaned in an automated manner.

The waste material removal device may have a suction arm drive to pivot the suction arm and a pivot drive control to control the suction arm drive.

The pivot drive control can be designed to receive a two-dimensional positional indication regarding a machining position of a machining head and, from the two-dimensional positional indication, to produce a command for a suction arm drive to adjust a pivot angle under consideration of the machining position of the machining head in the translational direction. The two-dimensional positional indication can include an indication regarding the machining position of the machining head in the translational direction. Each of the two aforementioned measures (pivot drive control and pivot angle adjustment) contributes to automation of positioning of the suction arm.

The pivot drive control can be designed to only change the pivot angle for a subsequent machining position if the new machining position of the machining head would otherwise be located beyond the device for separating waste materials (e.g., the deflector of the suction arm). The suction arm support and the suction arm therefore only need to follow the alternating machining position of the cutting beam (e.g., the laser beam) at reduced speed, amplitude and/or in a delayed manner. The complexity of the assembly, energy consumption, and wear of the assembly can thus be reduced.

The waste material removal device of the machining tool can include a contact rail having a longitudinal guide, on which the suction slide forms a thrust bearing. A number of movable, open parts, which are susceptible to contamination, can therefore be reduced and the reliability of the suction system can be increased.

Furthermore, a pivot axis of the suction arm can be arranged perpendicular to a machining plane of the machining tool. With a minimum of only two movable axes, the suction opening can thus be positioned suitably for each machining position. In addition, the suction opening in the suction arm can be arranged transverse (e.g., perpendicular) to the machining plane of the machining tool. The workpiece parts are thus prevented from falling directly into the suction arm.

In another aspect of the invention, a waste material removal device for a machining tool (e.g., a laser beam machining tool), includes a suction arm with a suction opening, to which a device for separating solid waste material parts according to their absolute weight (i.e., total weight) or specific weight (i.e., weight per volume) is assigned. The suction opening in the suction arm is oriented at an angle between 10° and 170° to the primary longitudinal axis of the suction arm. The primary longitudinal axis of the suction arm is typically oriented parallel to the workpiece support surface or to a machining plane. Due to the opening angle of the suction opening, waste material parts can thus be removed via the separating device and escaping gases, cinders or the like emerging from an underside of the workpiece can also be removed, without the waste material parts falling directly into the suction arm. This allows separation of the waste material parts according to their size or weight.

Furthermore, in this waste material removal device, the suction arm is typically arranged pivotably in relation to a suction arm support via a pivot axis. The suction opening and the separating device assigned thereto can thus be positioned below the machining point in the overall machining plane of the machining tool as a result of a simple design measure. Depending on the size of the machining plane, merely the pivoting motion of the suction may be sufficient. With a larger machining plane (e.g., a rectangular machining plane), a suction arm support which receives the suction arm may additionally be arranged movably in a direction of the machining plane.

In a further aspect of the invention, a method for waste material removal in a machining tool includes detecting a two-dimensional positional indication of a machining position of a machining head in relation to the workpiece support. The two-dimensional positional indication includes an indication regarding the machining position of the machining head in a machining axis Y. The method further includes establishing a pivot angle of the suction arm based on the machining position of the machining head. The method also includes outputting a command for a suction arm drive to adjust the pivot angle of the suction arm and a command for a path of displacement in the translational direction X for the suction arm support. Positioning of the suction arm and/or of a deflector can be automated. For example, programmed machine control can be used to position the suction arm and/or the deflector.

The invention and further advantageous embodiments and developments thereof will be described and explained in greater detail hereinafter with reference to the examples illustrated in the drawings. In accordance with the invention, the features to be inferred from the description and the drawings can be applied individually or together in any combination.

DESCRIPTION OF DRAWINGS

FIG. 2b shows a schematic partial view from above of the embodiment of FIG. 2a;

FIG. 3 shows a sectional view of the machining tool of FIG. 2a;

FIG. 6 shows a perspective view of a detailed region of a suction slide of the machining tool of FIG. 2a;

DETAILED DESCRIPTION

Figure 1:
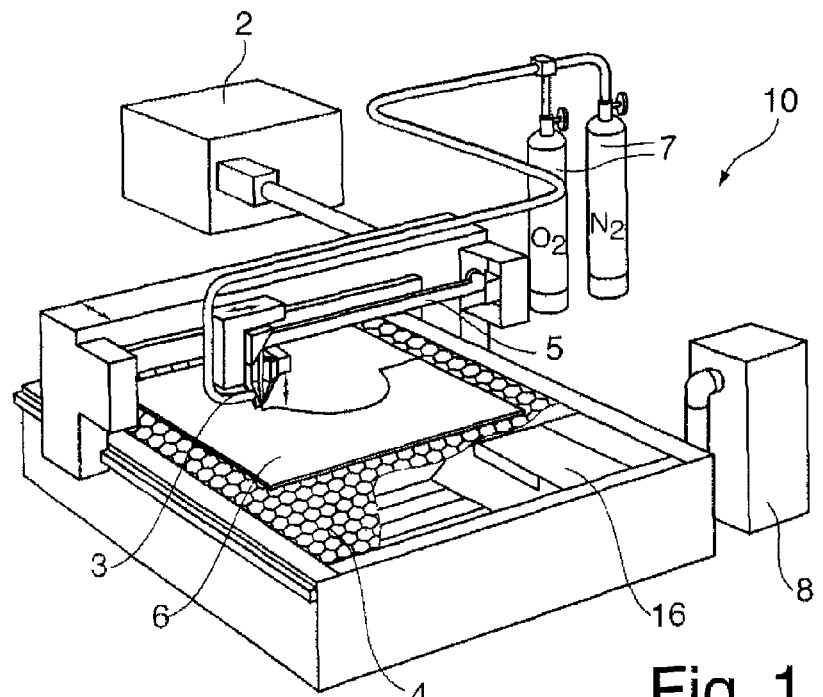
FIG. 1 shows a perspective view of a machining tool.

A perspective view of a machining tool 10 is illustrated in FIG. 1, showing the structure of a laser cutting machine as an exemplary embodiment of a laser beam machining tool. Further exemplary embodiments include, for example, a laser welding machine or a combined punching/laser cutting machine. This machining tool 10 has a $CO_2$ laser or a solid-state laser as a laser beam generator 2, a laser beam machining head or cutting head 3, and a workpiece support 4. A workpiece 6 is arranged on the workpiece support 4. A laser beam 5 is generated by the laser 2. The laser beam 5 is guided to the cutting head 3 from the $CO_2$ laser with the aid of deflecting mirrors or from the solid-state laser with the aid of a fiber optic cable. The laser beam 5 is directed onto the workpiece 6 by focusing optics arranged in the cutting head 3. The machining tool 10 is also supplied with cutting gases 7, for example oxygen and nitrogen. Compressed air or gases specific to the application can be provided as an alternative or in addition. The use of individual gases is dependent on the material of the workpiece 6 to be machined and on the quality requirements of the cut edges. Furthermore, a suction device 8 is provided and is connected to a suction duct 16, which is located below the workpiece support 4.

When cutting the workpiece 6 with use of oxygen as a cutting gas, the material of the workpiece 6 is generally melted and oxidized. With use of inert gases, such as nitrogen or argon, the material is merely melted. The melt particles produced are then blown off, together with the iron oxides where applicable, and are extracted via the suction duct 16 by the suction device 8, together with the cutting gas.

Figure 2A:
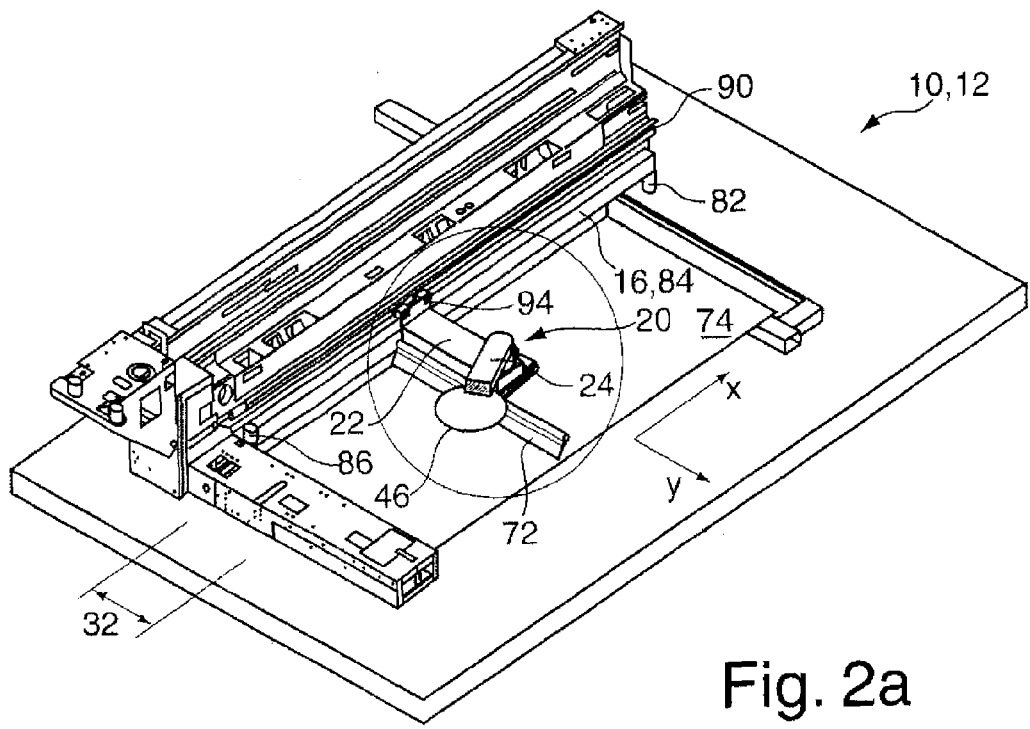
FIG. 2a shows a perspective partial view of an embodiment of the machining tool.

FIG. 2a shows a perspective plan view of an example of a machining tool (e.g. a cutting beam machining tool such as a laser beam machining tool) 10, having a waste material removal device 12. Referring to FIGS. 1 and 2, the waste material removal device 12 includes the suction device 8 with a fan and a fixed suction duct 16. The suction duct 16 extends along a machining axis (X-axis) in a translational direction x. The suction duct 16 is arranged substantially parallel to a machining plane 18 (shown in FIG. 3) of the machining tool 10. Apart from sealing lips or sealing brushes or a belt 84 with winding or return rollers 86, no flexible parts are required for the suction duct 16. The remaining parts can be produced from rigid and robust sheets and pipes. The suction duct 16 is subject only to a low level of wear due to the relatively small movements Δx of the suction slide 20. The flow resistance of the system is minimal. The fixed suction duct 16 typically extends along a longest movement axis (x-axis) of the machining tool 10. The suction slide 20 can be mounted on the fixed suction duct 16 by a sliding bearing or can be fastened thereon movably by means of a thrust bearing. The belt 84 and/or a contact rail 90 can be formed as part of this bearing assembly.

Figure 2B:
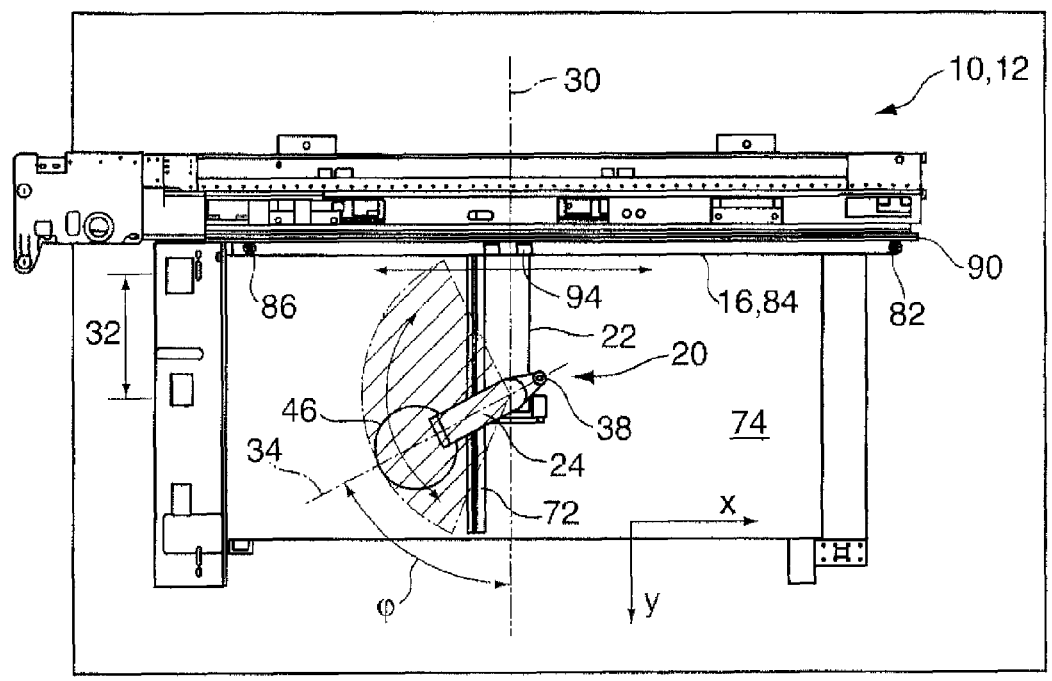

FIG. 2b shows a schematic partial view from above of the machining tool 10 of FIG. 1. The suction slide 20 has a suction arm support 22 and a suction arm 24, which is mounted on the suction arm support 22 by a pivot bearing so as to be pivotable about an axis of rotation 26 (shown in FIG. 4).

Figure 3:
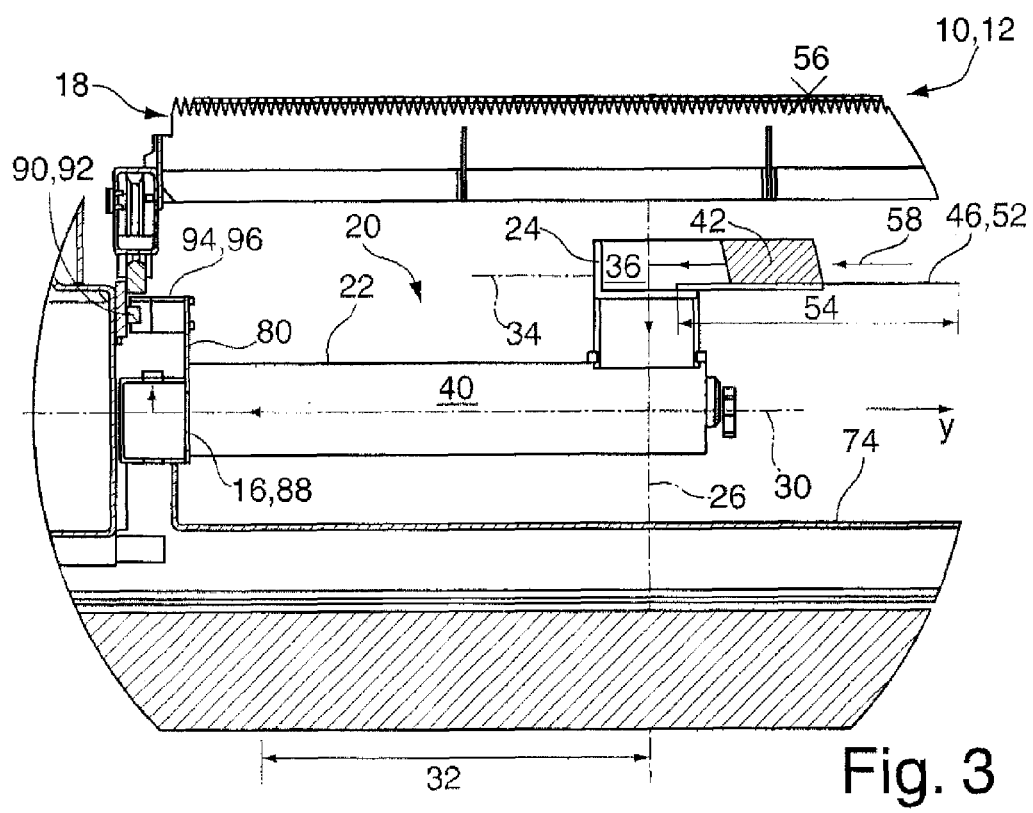

FIG. 3 shows a sectional side view of the machining tool 10. The suction slide 20 is arranged so as to be movable in a linear manner along the x-axis of the machine. The suction arm support 22 is mounted in a self-supporting manner on the fixed suction duct 16. A primary longitudinal axis 30 of the suction arm support 22 runs perpendicular to the fixed suction duct 16. The primary longitudinal axis 30 of the suction arm support 22 extends in a Y-direction of the machining tool 10, for example over a half-width 32 of a machining area. Alternatively, the suction arm support 22 can also be mounted on both sides of the machining area.

A primary longitudinal axis 34 of the suction arm 24 is arranged substantially parallel to the machining plane 18 of the machining tool 10 and is arranged parallel to a plane in which the primary longitudinal axis 30 of the suction arm support 22 is arranged. It is thus possible to arrange a bearing or guide 96 of the suction arm support 22 along one side of the machining tool 10. This promotes a compact overall design of the machining tool 10 having a waste material removal device 12. The suction arm 24 is typically articulated above the suction arm support 22. An articulation below the suction arm support 22, and even at the same level, is also possible.

When carrying out a laser beam machining operation using the machining tool 10, the waste material removal device 12 carries out a combined linear/pivoting motion (linear motion of the suction arm support 22 and a pivoting motion of the suction arm 24), as a result of which a suction opening 42 of the waste material removal device 12 is moved continuously into a position (in relation to a machining position 56 of the laser beam) which is suitable to ensure sufficient suction function. A deflector 46 of the waste material removal device can also be kept constantly below the machining position 56 (dependent on the movement of the laser beam machining head) of the laser beam during the machining operation by the combined linear and pivoting motion.

A controller is in communication with the motors that drive cutting head 3 and the suction arm 24. The controller receives a two-dimensional positional indication regarding the machining position 56 of the cutting head 3. The two-dimensional positional indication includes an indication regarding the machining position 56 of the cutting head 3 in a machining axis Y. The controller calculates a pivot angle φ of the suction arm 24 (shown in FIG. 2) based on the machining position 56 of the cutting head in the Y-direction. The controller also controls the suction arm drive 38 to adjust the pivot angle φ.

Figure 4:
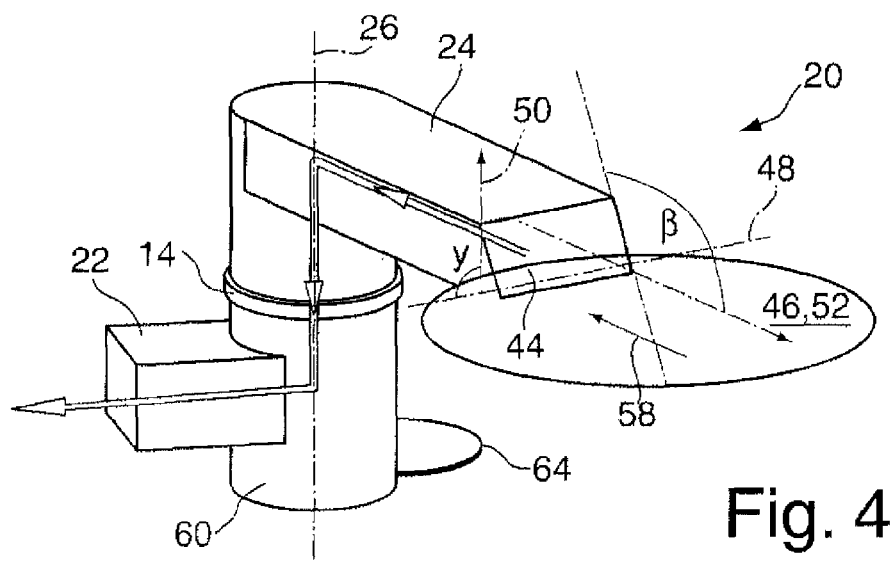
FIG. 4 shows a schematic, perspective view of an exemplary embodiment of a suction arm.
Figure 5:
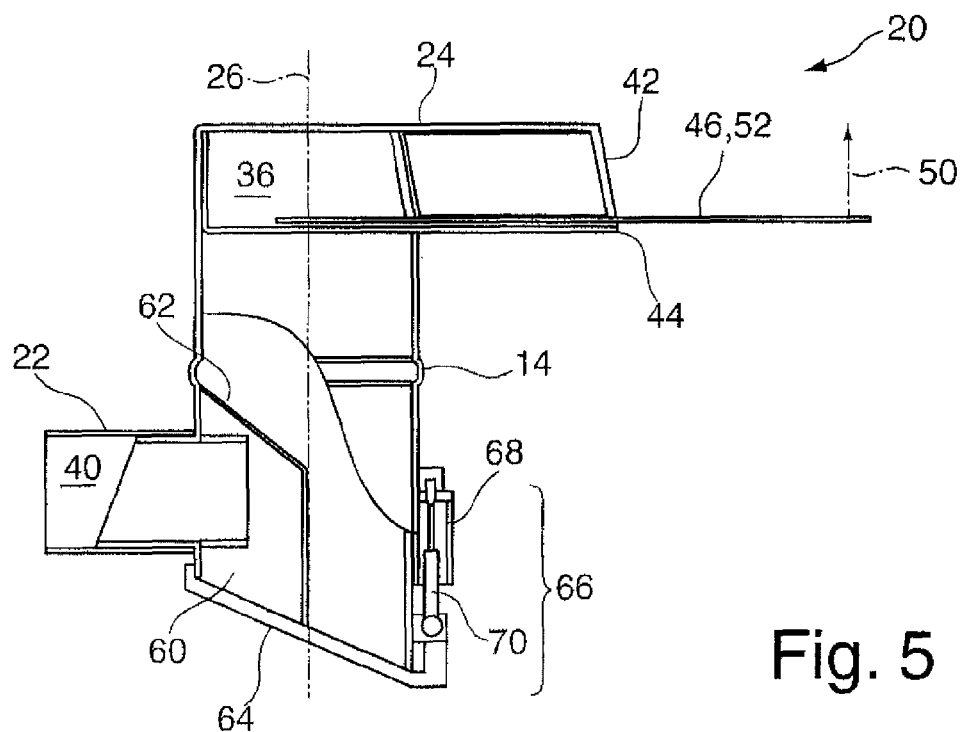
FIG. 5 shows a schematic side view of the suction arm of FIG. 4.

FIGS. 4 and 5 show schematic, perspective and side views, respectively of the suction arm 24. The suction arm 24 includes a suction duct 36. The suction arm 24 is coupled to the suction arm support 22 and is pivotable about a pivot axis 26. The pivot axis 26 is arranged substantially perpendicular to the machining plane 18 of the machining tool 10. The suction arm support 22 has a connecting duct 40, which connects the pivotable suction duct 36 to the fixed suction duct 16.

Due to the combination of linear movability of the suction arm support 22 along a machining X-axis and the pivotability of the suction arm 24, all points within the machining area (i.e., the area over which the cutting head 3 can be moved to perform cutting operations) can be reached in a simple and effective manner. The pivoting mechanism does not require any guide rails. The suction arm drive 38 (shown in FIG. 6) can be in the form of a pivoting cylinder, chain drive or belt drive or synchronous belt drive that pivots the suction arm 24 about the pivot axis 26. The pivot bearing for the pivoted articulation can be arranged in a connecting flange 14 between the suction duct 36 and the connecting duct 40.

Still referring to FIGS. 4 and 5, the suction arm 24 includes a pivotable suction duct 36. The suction duct 36 has a suction opening 42 at one end for aspirating waste materials from a machining process. The suction opening 42 encloses an angle β between 10° and 170° (e.g., 90°) with a lower edge 44 of the suction duct 36 or a primary longitudinal axis 34 of the suction arm 24.

The deflector 46 for separating solid waste materials can be attached to the lower edge 44 of the suction duct 36 in the region of the suction opening 42. The deflector 46 may be plate-like. The deflector 46 (which may also act as a heat protection plate) is located beneath the machining position 56 of the laser beam during operation of the laser machining tool 10. The deflector 46 is used as a baffle plate to optimize the suction effect for small workpiece parts and gaseous or smoke-like waste materials, and deflects a suction flow and waste materials from the machining process which are to be extracted, in the direction 58 of the suction opening 42.

In the case of conventional suction boxes and suction tubs, the opening for aspiration of the process waste materials extends parallel to the machining plane of the machining tool. In these suction devices, cut workpiece parts and offcuts of all sizes fall into the suction boxes or suction tubs, and these therefore have to be emptied frequently, which is laborious.

By contrast, the waste material removal device 12 can be operated in such a way that only gases and/or smoke and/or cinders and/or small workpiece parts are caught by the deflector 46 and drawn into the suction opening 42. Larger workpiece parts are not sucked in, but remain on the deflector 46 or fall to the base of the machining tool 10.

To clean the deflector 46, the suction arm 24 can be rotated and/or accelerated so quickly that a centrifugal force of workpiece parts arranged on the deflector 46 overcomes a static friction force of the workpiece parts on the deflector 46 so that the workpiece parts slide off or are shaken off the deflector 46 due to their inertia. Alternatively or in addition, it is also possible to subject the deflector 46 to vibrations by an actuator and/or to fold the deflector 46 about a folding axis 48, which, together with a surface normal 50 of a broad side 52 of the deflector 46, encloses an angle γ between 30° and 90° (e.g., between 80° and 90°). For example, the folding axis 48 can run perpendicular or parallel to a longitudinal axis of the suction arm 24. Workpiece parts which have slid off or which have been shaken off may fall onto the base of the machining tool 10 or onto a sweep-off plate 74 arranged in the tool or may be caught in a catching device. The workpiece parts arranged or caught on the base may be removed from the machining tool 10 during a laser beam machining process or may be removed from the machining tool 10 only after said process.

The deflector 46 can be used to absorb laser light radiation or heat, which is produced by the machining process with a laser beam. Parts of the machining tool 10 arranged beneath can therefore be protected against the laser beam or against a heating effect produced by the laser machining. Unintended welding of workpiece parts which have fallen down can thus be prevented, and therefore these parts can be removed more easily from the machining tool 10.

Precise and central positioning of the laser beam on the deflector 46 is not necessary for the absorption effect. It may be sufficient for the cutting beam to contact the deflector 46 generally. It is advantageous if the suction arm 24 does not also have to be moved together with the laser beam, the movements of the laser beam being small compared to the size of the deflector 46, and if, on the whole, it has to carry out fewer and/or slower movements and/or movements of smaller amplitude compared to a laser machining head, the course of movement of which is typically highly dynamic. The accuracy with which the deflector 46 has to be updated to the machining position 56 of the laser beam during laser machining may be dependent on the size of the deflector 46 (for example on the diameter 54 thereof; see FIG. 3) and/or on the suction properties of the waste material removal device 12 in the region of the suction opening 42 (such as suction performance). If the deflector 46 is arranged fixedly on the suction arm 24 during laser machining, the size 54 of the deflector 46 also determines, indirectly, the extent to which the suction arm support 22 and the suction arm 24 have to follow a changing machining position 56 of the laser beam.

For example, the deflector 46 includes a flat plate part, on which at least part of the cutting or laser beam impinges, at least temporarily, during the cutting or laser machining process. If the deflector 46 is subjected to the cutting or laser radiation, it may become worn. Commercially available sheet metal (for example made of steel or of aluminum) can be used to replace this worn part 46 in a cost effective manner. For improved radiation absorption, the sheet metal can be anodized or coated. The user himself of the machining tool 10 can typically cut the deflector 46 to size using the machining tool 10 and can himself replace the deflector according to the level of wear or at predefined intervals. It is possible to provide the deflector 46 with cooling ribs or with a cooling member and/or to cool the deflector on the underside thereof in order to prevent wear.

Gases and/or smoke and/or cinders and/or small parts, which are produced by the machining of a workpiece (e.g., a plate-like workpiece), are deflected at the deflector 46 and are sucked into the suction arm 24. Due to the concentrated suction provided accurately with respect to the machining position in accordance with the invention, the suction performance is greater than that of most conventional waste material removal devices (with identical energy consumption and complexity of the assembly).

Referring to FIG. 5, the suction arm support 22 or the suction arm 24 may have a collection container 60 for collection and removal of small extracted parts. The collection container 60 can be pot-like or tubular. The collection container 60 prevents small extracted parts from collecting in the suction arm 24, in the suction arm support 22 or in the fixed suction duct 16 at points which are not easily accessible or at points at which the collection of small extracted parts is undesirable for other reasons. The collection container 60 can be arranged beneath a flow region of the suction duct 36 or of the connecting duct 40 of the suction slide 20 so that the small parts can collect in the collection container 60. The pivot axis 26 of the suction arm 24 can run centrally or eccentrically through the collection container 60.

A baffle plate 62, which separates the waste gas from cinders and small parts (for example by changing a flow velocity in the suction flow), may be located above the collection container 60 (for example within a rotary tube). Cinders and/or small parts collect in the collection container 60. The collection container 60 may be removable and/or may have a pivotable or displaceable cleaning flap 64 on the underside.

The suction slide 20 may have a drive 66 for opening and/or closing the cleaning flap 64. The drive 66 includes a pneumatic cylinder 68 (for example a pushing or pulling short-stroke cylinder). The pneumatic cylinder 68 can be restored by a spring 70. The drive 66 is fastened to the collection container 60. A controller can be designed to move the suction arm support 22, in a cleaning operation mode, into an emptying position so as to open the cleaning flap 64 and deposit waste material collected in the collection container 60 at defined (for example easily accessible)

locations. This controller may be different, or the same, as controller which controls the pivot angle ϕ of suction arm 24.

Figure 6:
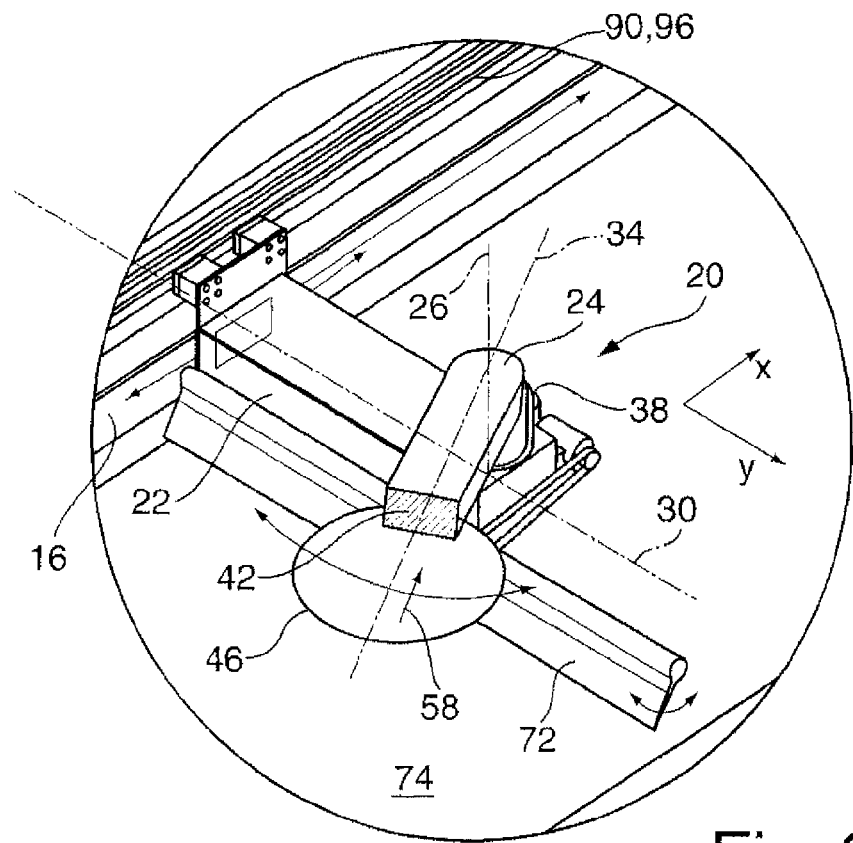

FIG. 6 shows a perspective view of a detailed region of the machining tool 10. A sweep-off plate 74 (for example made of high-grade steel) can be inserted in a machine frame beneath the suction slide 20 and can extend below the entire machining area. Parts which have fallen down can be removed from this sweep-off plate 74 more easily than from the floor of a factory building. A sweep-off flap 72 can be attached to the suction arm support 22 or to the suction arm 24 to remove large parts arranged on the base or on the sweep-off plate 74 when the suction slide 20 moves in a sweep-off direction. The sweep-off direction typically coincides with the longest axis of movement x of the machining tool 10. The sweep-off flap 72 is mounted pivotably (for example can be folded downwardly) on the suction slide 20 and may be controlled by a drive so as to adopt its working position or its idle position. Brushes and/or scrapers can be attached to the underside of the sweep-off flap 72. The sweep-off flap 72 extends over the entire width Δymax of a machining area.

Figure 7:
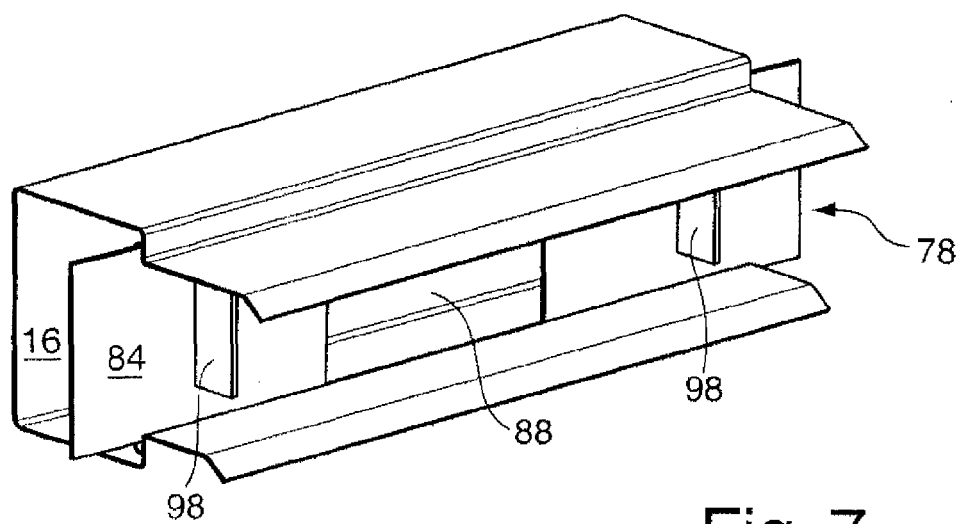
FIG. 7 shows a schematic, perspective view of an exemplary embodiment of a suction duct.

FIG. 7 shows a schematic, perspective view of an embodiment of the suction duct 16. The fixed suction duct 16 includes a U-profile with flanged tabs. A number of variants are possible for connection of the suction arm support 22 to the fixed suction duct 16. For example, a longitudinal side 78 (which is otherwise open) of the suction duct 16 can be closed by movable sealing lips or sealing brushes, with which the suction arm support 22 engages by a carriage 80 (shown in FIG. 3) or shuttle. The drive of the suction arm support 22 in a translational direction x can be achieved by means of a rack, a cylinder, a chain or a belt.

In an alternative embodiment, the carriage 80 is connected to a belt 84, which is displaceable in a translational direction x and which closes the (otherwise open) longitudinal side 78 of the suction duct 16.

The belt 84 may include a metal, an alloy, a plastics material, a natural fiber, or a composite material of one or more of the aforementioned materials. In the region of its guide face in the pairing with the material of the counter-face of the suction duct 16, the belt 84 typically has a sliding friction coefficient $\mu_G$ of less than 0.2 (e.g., less than 0.1). The displaceable belt 84 can be a continuously circulating belt, which is guided around return rollers 86 (shown in FIGS. 1 and 2), or a belt 84 which is wound and unwound by winding mandrels.

In a region in which the suction slide 20 is connected mechanically to or at least contacts the belt 84, the belt 84 has a suction opening 88, through which the aspirated waste materials (in particular a waste gas mixture) can pass. An overall length of the ducts 36, 40 and 16 and therefore a suction effect thus remain constant over the entre path of displacement Δxmax.

A drive 82 (shown in FIG. 2) can be designed to drive the belt 84. For example, the belt 84 can be driven by an electric motor and a biased driving roller or a driving pinion. The belt 84 can be designed to drive the suction arm support 22 in a translational direction x. Alternatively, it is possible for a suction arm support 22 driven in another manner in the translational direction x to drive the belt 84. A mechanical connection between the suction arm support 22 and the belt 84 can be provided by fastening tabs 98.

Figure 8:
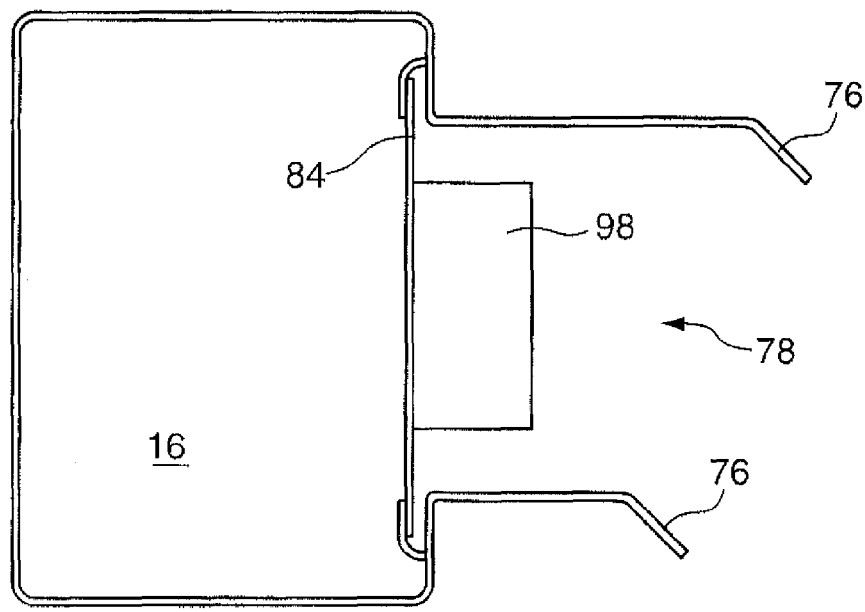
FIG. 8 shows a schematic side view of the suction duct of FIG. 7.

FIG. 8 shows a schematic side view of the exemplary embodiment of the suction duct 16 with the belt 84 and fastening tabs 98.

Figure 9:
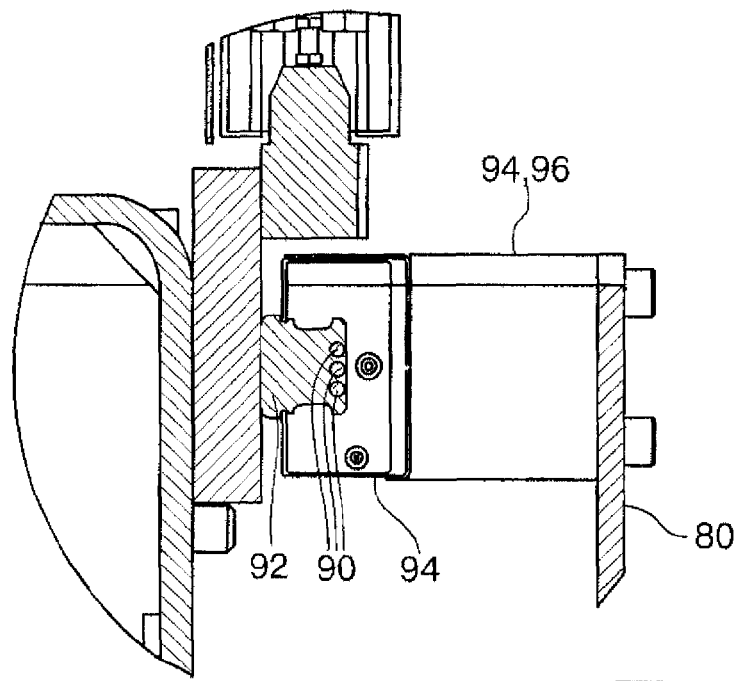
FIG. 9 shows a sectional side view of a guide rail and contact rail of a suction slide of the machining tool.

FIG. 9 shows a sectional side view of a guide rail 96 and contact rail 90 of the example of the machining tool 10. One or more guide rails 96 can be arranged in a plane above and/or below a primary longitudinal axis 30 of the suction arm support 22.

The machining tool 10 or a stationary part of the waste material removal device 12 may have contact rails 90 for transferring electrical energy and/or data from and/or to sliding contacts 92 of a tapper 94 of the suction slide 20. Energy chains can therefore be omitted. Due to a resultant reduction in the number of movable and open parts (that is to say parts which are susceptible to contamination), the reliability of the waste material removal system 12 can be increased. One or more contact rails 90 may be arranged in a plane above and/or below a primary longitudinal axis 30 of the suction arm support 22.

Figure 10:
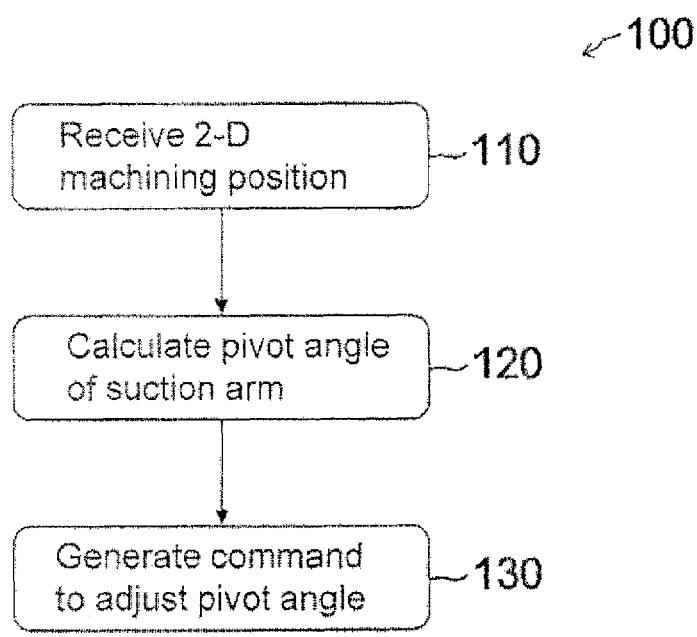
FIG. 10 shows a flow diagram for a waste material removal method.

FIG. 10 shows a flow diagram for a waste material removal method 100. In a first step 110, a two-dimensional positional indication regarding a machining position 56 of a cutting head is received, wherein the two-dimensional positional indication includes an indication regarding the machining position 56 of the cutting head 3 in a machining axis Y. In a second step 120, a pivot angle ϕ of the suction arm 24 (shown in FIG. 2) is calculated under consideration of the machining position 56 of the cutting head in the Y-direction. In a third step 130, a command for a suction arm drive 38 to adjust the pivot angle ϕ is generated and output.

A number of embodiments of the invention have been described. Nevertheless, it will be understood that various modifications may be made without departing from the spirit and scope of the invention. Accordingly, other embodiments are within the scope of the following claims.

What is claimed is:

1. A machining tool comprising:
   a waste material removal device comprising:
      a fixed suction duct; and
      a suction slide arranged on the fixed suction duct for carrying out a movement of the suction slide relative to the fixed suction duct in a translational direction, wherein the suction slide comprises a suction arm support and a suction arm that is fastened pivotably on the suction arm support.

2. The machining tool according to claim 1, wherein the suction arm comprises a separating device for separating solid waste material parts according to their weight.

3. The machining tool according to claim 2, wherein the separating device is an exchangeable planar deflector connected to the suction arm.

4. The machining tool according to claim 1, wherein a sweep-off flap is mounted pivotably on the suction arm support.

5. The machining tool according to claim 1, wherein the suction arm and/or the suction arm support comprise(s) a duct for the removal of waste gas and/or smoke.

6. The machining tool according to claim 5, wherein a belt drives the suction slide in the translational direction (x) and connects the duct to the fixed suction duct for removal of the waste gas and/or smoke by an opening in the belt.

7. The machining tool according to claim 5, wherein a portion of the duct in the suction arm and/or the suction arm support is arranged concentrically with a pivot axis of the suction arm.

8. The machining tool according to claim 1, wherein the pivot axis of the suction arm is arranged perpendicular to a machining plane of the machining tool.

9. The machining tool according to claim 1, wherein the suction slide is arranged in a self-supporting manner in relation to the suction duct.

10. The machining tool according claim 1, wherein the suction arm comprises a baffle plate for separating solid and gaseous or smoke-like waste materials.

11. The machining tool according to claim 1, wherein the suction arm comprises a collection container for temporary storage of solid waste materials.

12. The machining tool according to claim 11, wherein the collection container further comprises a removal device which removes solid waste materials from the suction arm and/or from the suction arm support.

13. The machining tool according to claim 1, wherein the machining tool comprises a machining head, and wherein a suction arm drive is configured to pivot the suction arm and a pivot drive control controls the suction arm drive, the pivot drive control being designed to receive a two-dimensional positional indication regarding a machining position of a machining head and, from said two-dimensional positional indication, to produce a command for the suction arm drive to adjust a pivot angle of the suction arm based on the machining position of the machining head.

14. The machine tool according to claim 13, wherein the pivot drive control is programmed to only change the pivot angle for a subsequent machining position if the new machining position of the machining head indicated by the two-dimensional positional indication would otherwise be located beyond the separating device of the suction arm.

15. The machining tool according to claim 1, wherein the suction arm has a suction opening transverse to a machining plane of the machining tool.

16. The machining tool according to claim 15, wherein the suction opening is perpendicular to a machining plane of the machining tool.

17. The machining tool according to claim 15, wherein the suction opening is oriented at an angle between 10° and 170° to a longitudinal axis of the suction arm.

18. A waste material removal device comprising:
   a suction arm having a suction opening; and
      a separating device for separating solid waste material parts according to their weight arranged at the suction opening, wherein the suction opening is oriented at an angle between 10° and 170° to a longitudinal axis of the suction arm.

19. The waste material removal device according to claim 18 comprising a suction arm support, wherein the suction arm is arranged to pivot about a pivot axis in relation to the suction arm support.

* * * * *

UNITED STATES PATENT AND TRADEMARK OFFICE
CERTIFICATE OF CORRECTION

PATENT NO. : 9,505,096 B2  
APPLICATION NO. : 13/482189  
DATED : November 29, 2016  
INVENTOR(S) : Werner Schweizer et al.

Page 1 of 1

It is certified that error appears in the above-identified patent and that said Letters Patent is hereby corrected as shown below:

On the Title Page

Column 1 (Assignee) delete "Ausserfld" and insert --Ausserfeld--.

In the Claims

Column 11, Line 4, in Claim 10, after "according" insert --to--.

Column 11, Line 24, in Claim 14, delete "machine" and insert --machining--.

Signed and Sealed this  
Seventh Day of February, 2017

Michelle K. Lee  
*Director of the United States Patent and Trademark Office*